(12) United States Patent  
Langer et al.

(10) Patent No.: US 8,026,823 B2
(45) Date of Patent: Sep. 27, 2011

(54) SUPPORT FOR SERVICE ACTIVITIES AT A PROGRAMMABLE LOGIC CONTROLLER (PLC)

(75) Inventors: Gunter Langer, Bannewitz (DE); Gunter Griessbach, Gelenau (DE)

(73) Assignee: Siemens Aktiengesellschaft, Munich (DE)

( * ) Notice: Subject to any disclaimer, the term of this patent is extended or adjusted under 35 U.S.C. 154(b) by 522 days.

(21) Appl. No.: 12/284,603

(22) Filed: Sep. 23, 2008

(65) Prior Publication Data

US 2009/0091464 A1 Apr. 9, 2009

(30) Foreign Application Priority Data

Sep. 28, 2007 (EP) .................................. 07019126

(51) Int. Cl.
*G08B 21/00* (2006.01)
(52) U.S. Cl. ..................................... 340/635; 340/691.1

(58) Field of Classification Search .................. 340/635, 340/649–654, 691.1–691.6
See application file for complete search history.

(56) References Cited

U.S. PATENT DOCUMENTS 6,160,528 A * 12/2000 Carpine et al. .................. 345/46

FOREIGN PATENT DOCUMENTS

| EP | 0 378 465 A1 | 7/1990 |
| FR | 2 694 439 A1 | 2/1994 |
| FR | 2 741 986 A1 | 6/1997 |

* cited by examiner

*Primary Examiner* — Jeffery Hofsass

(57) ABSTRACT

A PLC includes a first and second module. The first module having terminal positions and/or connectors behind a door located on its front side as well as having a display, and with the second module having a display unit. For servicing the first module, status messages for terminal position and/or connector of the first module are transmitted via a communication link to the second module and are displayed by a display of the second module.

17 Claims, 1 Drawing Sheet

US 8,026,823 B2

SUPPORT FOR SERVICE ACTIVITIES AT A PROGRAMMABLE LOGIC CONTROLLER (PLC)

CROSS REFERENCE TO RELATED APPLICATIONS

This application claims priority of European Patent Office application No. 07019126.7 EP filed Sep. 28, 2007, which is incorporated by reference herein in its entirety.

FIELD OF INVENTION

The invention relates to modules of a Programmable Logic Controller (PLC), a PLC, a method, a computer program product as well to a program stored thereon for supporting service activities at a PLC.

BACKGROUND OF INVENTION

Programmable Logic Controllers consisting of a number of modules are used in particular in the field of automation technology. During cabling, commissioning or servicing of Programmable Logic Controllers it is normal and sensible for the modules themselves to support service activities. As a rule each module generally has a label symbolizing what type of module it is, how many channels are present/available are how these are to be connected. Mostly the channels or interfaces are directly assigned a visual status display (LED). This makes it possible to use the status display for checking even when the PLC is being cabled. The symbolic module labeling is often also affixed to the inside of a door to be opened to the side, so that a direct assignment of the label to the terminals and the status displays is possible. In some cases, with digital input modules for example, the status displays can be used even if the PLC has not yet been switched on. Direct checking of the assignment of the cabling to the digital input avoids cabling errors right from the outset.

SUMMARY OF INVENTION

Previously there have been limitations in the area available for the symbolic labeling. A visual assignment between labeling, terminals and displays is only provided if the door for servicing is located to the left or right next to the terminals or displays. Also the labeling cannot be flexibly adapted for configurable modules. Not all modules allow passive cabling control (e.g. digital outputs). Diagnostic messages (e.g. short circuit and cable break) are also not available during commissioning.

In more recent Programmable Logic Controllers the displays (LEDs or display screens) are built into the door of the module. Access to the interfaces of the module is obtained by swinging the door upwards to open it. The problem here is that, when the door is opened, a direct assignment to the terminal locations/connectors is no longer possible. Even if the displays are visible on the rear of the door, a vertical assignment becomes more difficult.

The underlying object of the invention is to specify modules of a PLC, a PLC, a method, a computer program product as well as a program stored thereon for executing the method, with which service activities at a PLC can be better supported than with the previously known solutions.

This object is achieved by a module of a PLC with a door located on its front side, behind which terminal positions and/or connectors as well as a display are arranged, with the PLC being able to be put into a special operating state in which a status message is able to be transmitted for each terminal position and/or for each connector via a communication link to a second module and in which a reference to the second module is able to be output on the display.

The object is achieved by a module of a PLC with a display, with the PLC able to be put into a specific operating state in which status messages are able to be transmitted from terminal positions and/or connectors to a second module via a communication link and are able to be displayed by the display.

The object is further achieved by a PLC, a method, a program and a computer program product in accordance with the claims.

In the specific operating state ("Service") the PLC departs from its normal function. The operating state "Service" supports manipulation at a module (e.g. cabling and checking the cabling) and uses the display capabilities of a further module to do this. In this operating state the head module (CPU or IM) must already know the bus configuration and organize communication between the modules independently of the later user program. The inventive method (program) is necessary to do this. It is helpful for the configuration of the system to already be known at this time. The display unit can then already display the intended operating mode of the module at which the service activities are undertaken, which makes the information displayed more accurate. However the new "Service" function can also be viably used even without knowledge of the later configuration.

After a module door is opened the status messages of the terminal positions/connectors of the opened module are displayed on the display unit (for example with LEDs as display elements) of a further module. Preferably the neighboring module to the right is used for example; if this is not plugged in (or if it has no display unit) the module to the left can also assume the display function. A small indicator (e.g. an arrow) behind the opened door shows the assignment of the display function to the neighboring module. It is also possible, when a module is to be serviced, to plug in a specific module alongside the module to be serviced which assumes the display function, if for example no other module in the vicinity has a display unit. It is further possible for the display function to be assumed by another module, for example a CPU or another head module. This is especially useful if only the CPUs or head modules possess a display unit.

The advantage of the inventive modules of an inventive PLC with an inventive program for executing an inventive method lies in the use of the display options of a further module, preferably a neighboring module, during servicing, i.e. during cabling, commissioning and maintenance of the PLC. The invention saves considerable extra costs (e.g. for an additional display unit on the rear of the door of each module) and offers the customer/user simultaneously very good handling support, i.e. undertaking service activities (ease of use).

In an advantageous form of the embodiment diagnostic messages relating to cabling of the terminal positions and/or connectors are able to be transferred via the communication link to the second module and displayed by the latter by means of the display unit. In the operating state "Service" this also supports diagnosis such as short circuit and cable-break diagnosis, with the display options of the further module again being used.

In a further advantageous embodiment status messages of at least one input and/or output unit are able to be transferred via the communication link to the second module and are able to be displayed by the latter by means of the display unit. Thus information about further elements of the module—such as control elements, memory cards or any slide-in modules—can be presented to the customer/user.

In a further advantageous embodiment the specific operating state is activated by opening the door and deactivated by closing the door. This further facilitates handling for the customer/user.

In a further advantageous embodiment the module to be serviced also features a display unit. Thus the module to be serviced can also assume the display function for another module at which service activities are already being undertaken. In the ideal case, i.e. if each module of a PLC has a display unit, in a row of modules connected alongside each other each module can assume the display function for the respective neighboring module, which makes service activities by the customer/user easier through the proximity of the display of status and/or diagnostic messages to the module to be serviced.

In a further advantageous embodiment the display unit is embodied as display screen. When display screens are used the state of the terminal positions/connectors as well as the assignment can be shown especially well. In addition this enables the presentation to be flexibly adapted for configurable modules.

In a further advantageous embodiment the display unit is arranged in the outer side of the door or on the front side of the module. In this way the status and/or diagnostic messages of the module to be serviced can be read without further direct handling of the further module.

BRIEF DESCRIPTION OF THE DRAWINGS

The invention is described and explained in more detail below on the basis of the exemplary embodiments shown in the figures. The figures are as follows.

DETAILED DESCRIPTION OF INVENTION

Figure 1:
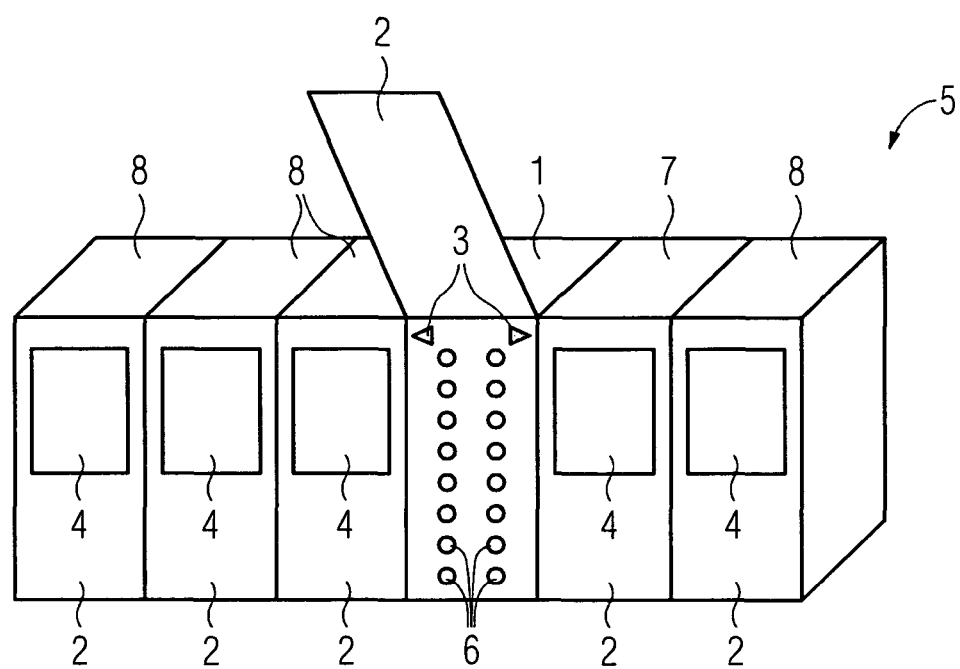
FIG. 1 a number of neighboring modules of a PLC in the service state.

FIG. 1 shows a number of modules 1, 7, 8 of a PLC 5, each of which has a display 4 in a front-side door 2, behind which the terminal positions/connectors 6 are located. Service activities are to be undertaken on the module 1 (e.g. cabling), the door 2 is opened and thus the module's own display 4 is hinged up. PLC 5 is in the service state, in which status messages are transferred via a communication link in the exemplary embodiment shown in the figure to the neighboring module 7 on the right which displays the status messages on its display 4. This means that the display 4 of module 7 takes over support of service activities at module 1, in which case a display 3 at the module 1 to be maintained notifies the customer/user that the right-hand neighboring module 7 is displaying the status messages on its display 4. Also able to be shown on the display 4 are diagnostic messages relating to the cabling of the terminal positions/connectors 6, so that, even while service activities are taking place, the diagnosis of short circuits and cable breaks is possible for example. The use of inventive modules 1, 7, 8 enables a very high level of customer/user support to be obtained during handling of an inventive PLC 5, without additional costs being incurred for a second display on the rear of the door 2 for example.

Figure 2:
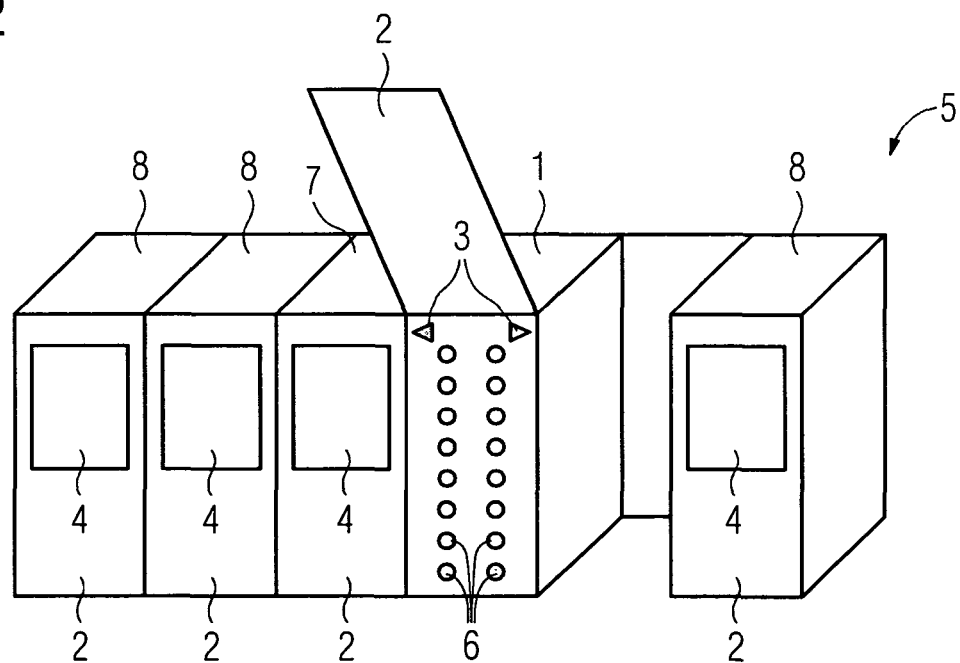
FIG. 2 a number of modules of a PLC in the service state, between which there is a free slot.

FIG. 2 shows an arrangement of modules 1, 7, 8 of a PLC 5, essentially corresponding to the arrangement depicted in FIG. 1. 1. However, in the arrangement shown in this figure, there is a free slot to the right next to the module 1, at which service activities are to be undertaken. Thus, in the exemplary embodiment depicted in this figure, display 4 of the left-hand module 7 takes over service support. The display 4 is again assigned by the display 3. For an explanation of the further reference symbols see the previous figure description.

In summary the invention relates to modules of a Programmable Logic Controller (PLC), a PLC, a method, a computer program product as well as to a program stored thereon for supporting service activities at a PLC. To facilitate said activities a PLC with at least one first and one second module is proposed, with the first module having terminal positions and/or connectors behind a door located on its front side as well as having a display, and with the second module having a display unit. To service the first module its door is opened and the PLC is placed in a special operating state in which status messages for each terminal position and/or each connector are transmitted via a communication link of the first module to the second module, in which by means of the display at the first module an indication is shown on the second module and in which the status messages are output by means of the display unit of the second module.

The invention claimed is:

1. A first module of a Programmable Logic Controller (PLC) communicatively coupled to a second module of the PLC via a communication link, the first module comprising:
    a door located on the front side of the first module;
    terminals and/or connectors arranged behind the door;
    a status message is transmitted to the second module of the PLC via the communication link, the status message pertaining to at least one of the terminals and/or one of the connectors; and
    a display indicator arranged behind the door that indicates the transmitted information is displayed by the second module.

2. The first module as claimed in claim 1, wherein a diagnostic message relating to a cabling of at least a portion of the terminals and/or a portion of the connectors is transmitted via the communication link to the second module for display.

3. The first module as claimed in claim 1, wherein a status message relating to an input and/or output unit is transmitted via the communication link to the second module for display.

4. The first module as claimed in claim 1,
    wherein the PLC is placed into an operating state to allow the transmission of the messages to be displayed by the second module, and
    wherein the operating state is activated by opening the door and deactivated by closing the door.

5. The first module as claimed in claim 1, wherein the module further comprises a display unit.

6. The first module as claimed in claim 5, wherein the display unit is a display screen.

7. The first module as claimed in claim 5, wherein with the display unit is arranged on the outer side of the door.

8. A Programmable Logic Controller, comprising:
    a first module, comprising:
        a door located on the front side of the first module, and
        terminals and/or connectors arranged behind the door; and
    a second module, comprising:
        a door located on the front side of the second module, and
        a display unit, and
    wherein the PLC is placed into a operating state in which a message is transmitted from the first module to the second module via a communication link, and
    wherein the message is displayed via the display unit of the second module.

9. The PLC as claimed in claim 8, wherein a the message includes at least one of the following data selected from a status of a terminal position, status of a connector, diagnostics relating to a cabling of a terminal position, and diagnostics relating to a cabling of a connector.

10. The PLC as claimed in claim 8,
wherein the operating state is activated by an opening of the door on the first module, and
wherein the operating state is deactivated by a closing of the door on the first module.

11. The PLC as claimed in claim 8, wherein the display unit is arranged on the outer side of the door of the second module.

12. A method for supporting service activities at a Programmable Logic Controller (PLC) having a first and second module, comprising:
opening a door arranged on a front side of the first module;
activating an operating state of the PLC in response to the door being open;
transmitting a first status message from the first module to the second module after the activation, the first status message pertaining to a status a terminal position and/or a connector of the first module;
receiving the first status message by the second module;
displaying the received first status message at a display unit on the second module; and
indicating that the second module will display the received messages via a visual display at the first module.

13. The method as claimed in claim 12, further comprising:
transmitting a diagnostic message from the first module to the second module, the diagnostic relating to cabling of the terminal position and/or connector;
receiving the diagnostic message by the second module; and
displaying the received diagnostic message at the display unit.

14. The method as claimed in claim 12, further comprising:
transmitting a second status message from the first module to the second module, the second status message relating to an input and/or output unit;
receiving the second message by the second module; and
displaying the received second status message at the display unit.

15. The method as claimed in claim 12, comprising deactivated the operating state in response to closing the opened door.

16. The method as claimed in claim 12, wherein the display unit is arranged on a front side of the second module.

17. A non-transitory computer readable medium having program instructions tangibly stored thereon executable by a processor to perform the method according to claim 12.

* * * * *